United States Patent
Yoon et al.

(10) Patent No.: US 6,780,938 B2
(45) Date of Patent: Aug. 24, 2004

(54) REACTOR ALLOY OF SYNDIOTACTIC POLYSTYRENE HAVING HIGH IMPACT RESISTANCE

(75) Inventors: Sung Cheol Yoon, Seoul (KR); Xuequan Zhang, Taegeon (KR); Jae Gon Lim, Taegeon (KR); Hyun Joon Kim, Taegeon (KR); Young Sub Lee, Taegeon (KR)

(73) Assignee: Samsung Atofina Co. Ltd. (KR)

( * ) Notice: Subject to any disclaimer, the term of this patent is extended or adjusted under 35 U.S.C. 154(b) by 0 days.

(21) Appl. No.: 10/343,874
(22) PCT Filed: Jul. 20, 2001
(86) PCT No.: PCT/KR01/01240
§ 371 (c)(1),
(2), (4) Date: Feb. 27, 2003
(87) PCT Pub. No.: WO02/14425
PCT Pub. Date: Feb. 21, 2002

(65) Prior Publication Data
US 2003/0176581 A1 Sep. 18, 2003

(30) Foreign Application Priority Data
Aug. 14, 2000 (KR) ........................................ 2000-46991

(51) Int. Cl.$^7$ .......................... C08L 23/00; C08L 23/04; C08L 25/06
(52) U.S. Cl. ..................... 525/210; 525/211; 525/213; 525/214; 525/232; 525/240; 525/241
(58) Field of Search ................................. 525/210, 211, 525/213, 214, 232, 240, 241

(56) References Cited

U.S. PATENT DOCUMENTS

| 5,164,479 | A | * | 11/1992 | Funaki et al. | 528/481 |
| 6,048,932 | A | | 4/2000 | Okada et al. | |
| 6,080,819 | A | * | 6/2000 | Raetzsch et al. | 525/240 |
| 6,544,922 | B1 | * | 4/2003 | Marks et al. | 502/152 |

FOREIGN PATENT DOCUMENTS

| JP | 62-257950 | 11/1987 |
| JP | 64-046912 | 2/1989 |
| JP | 1178505 | 5/1989 |
| JP | 1279944 | 11/1989 |
| JP | 02-064140 | 3/1990 |

* cited by examiner

Primary Examiner—Nathan M. Nutter
(74) Attorney, Agent, or Firm—Woodcock Washburn LLP

(57) ABSTRACT

The reactor alloy of syndiotactic polystyrene according to the present invention is prepared by polymerizing vinyl aromatic monomer and rubbery elastomer and optionally polyphenylene ether under transition metal catalyst and cocatalyst, which comprises (a) 50–99% by weight of syndiotactic polystyrene, (b) 1–50% by weight of rubbery elastomer, and optionally (c) 0.1–10% by weight of polyphenylene ether. The reactor alloy of the present invention has good dispersibility and high interfacial strength in comparison with a melt blend by polymerizing styrene monomer and rubbery elastomer for impact modifier. And the reactor alloy of the present invention is greatly enhanced in impact resistance in comparison with a melt blend same amount of rubber component as reactor alloy of the present invention without impairing heat resistance and elastic modulus by further comprising polyphenylene ether.

13 Claims, 1 Drawing Sheet

REACTOR ALLOY OF SYNDIOTACTIC POLYSTYRENE HAVING HIGH IMPACT RESISTANCE

TECHNICAL FIELD

The present invention relates to a reactor alloy of syndiotactic polystyrene having high impact resistance. More particularly, the present invention relates to a reactor alloy of syndiotactic polystyrene greatly enhanced in impact resistance in comparison with a melt blend without impairing heat resistance and elastic modulus by introducing rubbery elastomer and polyphenylene ether.

BACKGROUND ART

A styrenic polymer with syndiotactic configuration (hereinafter 'sPS') is excellent in heat resistance and chemical resistance but is poor in impact resistance. Therefore, it has heretofore been limited in the scope of application usable as a construction material. In order to solve the problem, improvement has been made on the impact resistance of sPS. For example, Japanese Patent Application Laid-Open Nos. 62-257950 (1987), 1-279944 (1989) and 2-64140 (1990) disclose that the impact resistance of sPS can be improved by blending a rubbery elastomer. Especially, Japanese Patent Application Laid-Open No.1-279944 (1989) shows that an atactic polystyrene incorporated in a rubbery elastomer (block or graft copolymer) acts as a compatibilizer, thereby increasing impact resistance. In addition, Japanese Patent Application Laid-Open No.1-279944 (1989) employs a polyphenylene ether as well as a rubbery elastomer, resulting in a great enhancement of impact resistance.

However, the above-mentioned techniques have some disadvantages in that a block or graft copolymer or a rubbery component containing atactic polystyrene chain has a low compatibility with sPS, resulting in ununiform dispersibility and low interfacial strength of the rubbery. Therefore, the enhancement of impact resistance has still been insufficient. Further, in the case of adding a large amount of a poly (phenylene ether) for the purpose of enhancing the impact resistance, addition of a poly(phenylene ether) inevitably brings about deterioration of the resultant composition with respect to hue and long-term heat resistance as well as decrease in crystallinity of sPS.

In order to solve the above-mentioned problems, U.S. Pat. No. 6,048,932 shows an increase of compatibility between components by chemically treating sPS, a rubbery elastomer, polyphenylene ether etc. with maleic anhydride or amine to induce chemical bonds between the components. However, since interfacial strength between the phases is still insufficient, there exists limitation in modified impact resistance. Further, addition of a process for the chemical treatment causes economical and technical disadvantages.

Accordingly, the present inventors have developed a syndiotactic polystyrene which is greatly enhanced in impact resistance without use of any special compatibility agent Further, the styrenic resin composition of the present invention comprising sPS, thermoplastic resin or rubbery elastomer, and polyphenylene ether can be produced by palletizing after polymerization without using a complicated extruder, and the sPS composition is greatly enhanced in impact resistance.

OBJECT OF THE INVENTION

A feature of the present invention is the provision of a reactor alloy of syndiotactic polystyrene having high impact resistance.

Another feature of the present invention is the provision of a syndiotactic polystyrene having high impact resistance with no use of a compatibilizer.

A further feature of the present invention is the provision of a reactor alloy of syndiotactic polystyrene having good compatibility between the components.

A further feature of the present invention is the provision of a syndiotactic styrenic resin composition with advantages in controlling reactor fouling and heat of polymerization in the preparation of syndiotactic polystyrene resin composition.

A farther feature of the present invention is the provision of a syndiotactic styrenic resin composition suitable for injection or extrusion molding.

Other objects and advantages of this invention will be apparent from the ensuing disclosure and appended claims.

SUMMARY OF THE INVENTION

The reactor alloy of syndiotactic polystyrene according to the present invention is prepared by polymerizing vinyl aromatic monomer and rubbery elastomer under the catalyst system consisting of a transition metal catalyst and a cocatalyst, which comprises (a) 50–99% by weight of sydiotactic polystyrene; (b) 1–50% by weight of rubbery elastomer, and optionally (c) 0.1–10% by weight of polyphenylene ether. The reactor alloy of syndiotactic polystyrene according to the present invention has an enhanced impact resistance in comparison with a melt blend.

DETAILED DESCRIPTION OF THE INVENTION

Figure 1:
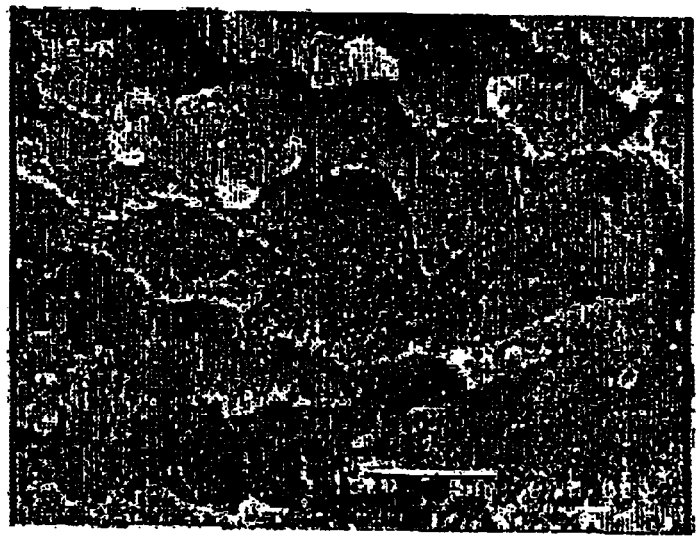
FIG. 1 is a scanning electron microscope (SEM) photograph of an injection molded test piece of the reactor alloy prepared in accordance with the method of Example 2.

The reactor alloy of syndiotactic polystyrene having high impact resistance according to the present invention can be prepared by reacting vinyl aromatic monomer, rubbery elastomer and optionally polyphenylene ether under the catalyst system consisting of a transition metal catalyst and a cocatalyst. The reactor alloy of syndiotactic polystyrene of the present invention comprises (a) 50–99% by weight of syndiotactic polystyrene having 30–99% (triad) of syndiotacticity; (b) 1–50% by weight of rubbery elastomer; and optionally (c) 0.1–10% by weight of polyphenylene ether.

(a) Syndiotactic Polystyrene

The styrenic polymer in the reactor alloy of syndiotactic polystyrene of the present invention has a syndiotactic configuration and is employed as a matrix.

The syndiotactic configuration in the styrenic polymer has a stereostructure in which phenyl groups as side chains are located alternately at opposite directions relative to the main chain consisting of carbon-carbon bonds. Tacticity is quantitatively determined by the nuclear magnetic resonance method ($^{13}$C-NMR method) using a carbon isotope. The tacticity can be shown in terms of proportions of structural units continuously connected to each other, i.e., a diad in which two structural units are connected to each other, a triad in which three structural units are connected to each other and a pentad in which five structural units are connected to each other. The syndiotactic configuration can be characterized by $^{13}$C-NMR showing chemical shifts of methine having a phenyl group depending on the proportion of a racemic structure and a meso structure.

The syndiotactic polystyrene of the present invention includes polystyrene, poly(alkylstyrene), poly(halogenated styrene), poly(alkoxystyrene), poly(vinyl benzoate), hydrogenated polystyrene, the copolymers thereof, and the mixtures thereof. It is preferable that the syndiotactic polystyrene has a proportion of racemic diad of at least 75%, more preferably at least 85%, or a proportion of racemic pentad of at least 30%, more preferably at least 50%.

The poly(alkylstyrene) includes poly(methylstyrene), poly(ethylstyrene), poly(isopropylstyrene), poly(tert-butylstyrene), poly(phenylstyrene), poly(vinylnaphthalene) and poly(vinylstyrene) and the like. The poly(halogenated styrene) includes poly(chlorostyrene), poly(bromostyrene), and poly(fluorostyrene) and the like. The poly(alkoxystyrene) includes poly(methoxystyrene), and poly(ethoxystyrene) and the like.

More particularly, the above-mentioned styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene and the copolymers thereof.

The above-mentioned styrenic polymer may be used alone or in combination with one another.

The weight-average molecular weight of the styrenic polymer to be used in the present invention is not specifically limited, but is desirably 10,000 or more, more desirably 50,000 or more. If the weight-average molecular weight is less than 10,000, it is unfavorable because the thermal or mechanical properties are sometimes deteriorated The molecular-weight distribution is not specifically limited as well, but may be in a wide range.

Vinyl Aromatic Monomer

The styrenic polymer having syndiotactic configuration can be produced by polymerizing a vinyl aromatic monomer in the presence or absence of a solvent by the use of a metallocene catalyst and a cocatalyst. In addition, the impact-resistant sPS resin composition employing poly (halogenated alkylstyrene) and the hydrogenated product thereof can be produced by the processes described in Japanese Patent Application Laid-Open Nos. 46912(1989) and 178505(1989), respectively.

The vinyl aromatic monomer of the present invention is represented by the formulae (A) and (B):

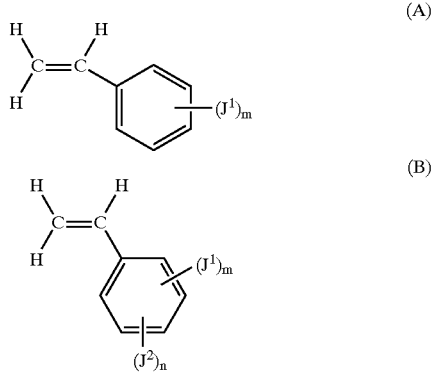

In formula (A), $J^1$ is a hydrogen; a halogen; or a substituting group containing at least one of carbon, oxygen, silicon, phosphorus, sulfur, selenium and tin; and m is an integer of 1 to 3. If m is 2 or 3, $J^1$s may be different each other.

In formula (B), $J^1$ is a hydrogen; a halogen; a substituting group containing at least one of carbon, oxygen, silicon, phosphor, sulfur, selenium and tin; $J^2$ is a substituting group of $C_{2-10}$ having at least one unsated bond; m is an integer of 1 to 3, if m is 2 or 3, $J^1$s may be different each other, and n is 1 or 2, if n is 2, $J^2$s may be different each other.

The representative examples of formula (A) are alkylstyrene; halogenated styrene; halogen-substituted alkylstyrene; alkoxystyrene; vinylbiphenyl; vinylphenylnaphthalene; vinylphenylanthracene; vinylphenylpyrene; trialkylsilylvinylbiphenyl; trialkylstanylvinylbiphenyl; alkylsilylstyrene; carboxylmethylstyrene; alkylesterstyrene; vinylbenzenesulfonate; and vinylbenzyldialkoxyphosphite and the like.

The representative examples of alkylstyrene are styrene, methylstyrene, ethylstyrene, butylstyrene, p-methylstyrene, p-tert-butylstyrene, and dimethylstyrene; those of halogenated styrene are chlorostyrene, bromostyrene, and fluorostyrene; those of halogen-substituted: alkylstyrene are chloromethylstyrene, bromomethylstyrene, and fluoromethylstyrene; those of alkoxystyrene are methoxystyrene, ethoxystyrene, and butoxystyrene; those of vinylbiphenyl are 4-vinylbiphenyl, 3-vinylbiphenyl, and 2-vinylbiphenyl; those of vinylphenylnaphthalene are 1-(4-vinylbiphenylnaphthalene), 2-(4-vinylbiphenylnaphthalene), 1-(3-vinylbiphenylnaphthalene), 2-(3-vinylbiphenylnaphthalene), and 1-(2-vinylbiphenylnaphthalene); those of vinylphenylanthracene are 1-(4-vinylphenyl)anthracene, 2-(4-vinylphenyl)anthracene, 9-(4-vinylphenyl)anthracene, 1-(3-vinylphenyl)anthracene, 9-(3-vinylphenyl)anthracene, and 1-(4-vinylphenyl)anthracene; those of vinylphenylpyrene are 1-(4-vinylphenyl)pyrene, 2-(4-vinylphenyl)pyrene, 1-(3-vinylphenyl)pyrene, 2-(3-vinylphenyl)pyrene, 1-(2-vinylphenyl)pyrene, and 2-(2-vinylphenyl)pyrene; that of trialkylsilylvinylbiphenyl is 4vinyl-4-trimethylsilylbiphenyl; and those of alkylsilylstyrene are p-trimethylsilylstyrene, m-trimethylsilylstyrene, o-trimethylsilylstyrene, p-triethylsilylstyrene, m-triethylsilylstyrene, and o-triethylsilylstyrene.

The representative examples of formula (B) are divinylbenzene such as p-divinylbenzene and m-divinylbenzene; trivinylbenzene; and arylstyrene such as p-arylstyrene and m-arylstyrene.

Metallocene Catalysts and Cocatalysts

A conventional catalyst for preparing polystyrene having high syndiotacticity can be employed in the present invention, but is not limited particularly. In general, metallocene catalysts consisting of a transition metal compound of Group IV element of the Periodic Table can be used. Preferably, a titanium compound of Group IV can be used in the metallocene catalyst system. The catalysts are disclosed in U.S. Ser. Nos. 08/844,109 and 08/844,110 in detail.

In the present invention, the metallocene catalyst system uses a cocatalyst. The cocatalyst is an organometallic compound such as alkyl aluminoxane and alkyl aluminum compound, which are known to an ordinary skilled person in the art. The representative examples of allyl aluminoxane are methyl aluminoxane (MAO), modified methyl aluminoxane (TAO). The alkyl aluminoxane has a repeating unit of the following formula (C). The alkyl aluminoxane is divided into a linear alkyl aluminoxane represented by the following formula (D) and a cyclic alkyl aluminoxane represented by the following formula (E):

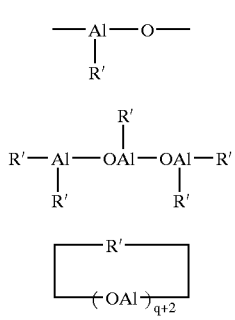

where $R^1$ is an alkyl group of $C_{1-6}$ and q is an integer of 0–100.

A mixture of a non-coordinated Lewis acid and an alkyl aluminum can be used as a cocatalyst. The non-coordinated Lewis acid is selected from the group consisting of N,N-dimethylane tetrakis(pentafluorophenyl)borate, triphenylcarbenium tetrakis(pentafluorophenyl)borate, and ferrocerium tetrakis(pentafluorophenyl)borate and tris(pentafluorophenyl)borate. The alkylaluminum is selected from the group consisting of trimethylaluminum, triethylaluminum, diethylaluminum chloride, dimethylaluminum chloride, triisobutylaluminum, diisobutylaluminum chloride, tri(n-butyl)aluminum, tri(n-propyl)aluminum, triisopropylaluminum and the like. Among these triisobutylaluminum is preferably used in particular.

(b) Rubbery Elastomer

A rubbery elastomer having an olefinic component of the present invention is used for the purpose of improving the impact resistance of reactor alloy.

Such rubbery elastomer contains, as a monomer unit in its structure, an olefinic component such as ethylene, propylene, butylene, octene, butadiene, isoprene, norbornene, norbornadiene and cyclopentadiene. Specific examples of such rubbery elastomer include natural rubber; polybutadiene; polyisoprene; polyisobutylene; neoprene; ethylene/styrene pseudo random copolymer (ESI); styrene/butadiene block copolymer (SBR); styrene/butadieneistyrene block copolymer (SBS); hydrogenated styrene/butadiene/styrene block copolymer)(SEBS); styrene/isoprene block/styrene block copolymer (SIS); hydrogenated styrene/isoprene block/styrene block copolymer (SEPS); ethylene/propylene rubber (EPM); ethylene/propylene/dien rubber (EPDM); and rubber formed by modifying any of the foregoing with a modifying agent Preferable rubbery elastomers among these are SEBS, SBR, SBS, EPM and EPDM.

Specific examples of the polyolefin include isotactic polypropylene, syndiotactic polypropylene, atactic polypropylene, block polypropylene, random polypropylene, high-density polyethylene, low-density polyethylene, linear low-density polyethylene, ethylene/octane copolymer, cyclic polyolefin, polybutene, 1,2-polybutadiene and a copolymer thereof.

The rubbery elastomer is blended in an amount of 1 to 50%, preferably 2 to 40%, more preferably 5 to 40% by weight. A blending amount less than 1% by weight results in little effect on the improvement of impact resistance, whereas more than 50% by weight unfavorably brings about remarkable deterioration of modulus of elasticity as well as heat resistance of the resin composition.

Especially, the rubbery elastomer (b) includes a styrene/olefin block or graft copolymer having at least 180° C. of a micro-phase separation temperature, which plays a role as a compatibilizing agent between sPS and polyolefin. The temperature higher than micro-phase separation temperature results in a failure for forming a micro-phase separation structure, whereas the temperature lower than that leads to formation of such structure.

The micro-phase separation temperature of the rubbery elastomer is determined by diluting with dioctyl phthalate a solution with a concentration of 60% by weight. The above-exemplified olefinic composition or rubbery elastomer of polyolefin may be used alone or in combination with at least one component.

(c) Polyphenylene Ether

The reactor alloy of syndiotactic polystyrene having high impact resistance according to the present invention may optionally comprise polyphenylene ether. The poly(phenylene ether) is prepared usually by oxidative coupling reaction of di- or tri-substituted phenol in the presence of a cupramine complex, as shown in U.S. Pat. Nos. 3,306,874, 3,306,875, 3,257,357 and 3,257,358. The cupramine complex there may be derived from any one of primary, secondary and tertiary amines.

Specific examples of the suitable poly(phenylene ether) include poly(2,3-dimethyl-6-ethyl-1,4-phenylene ether),
poly(2-methyl-6-chloromethyl-1,4-phenylene ether),
poly(2-methyl-6-hydroxyethyl-1,4-phenylene ether),
poly(2-methyl-6-n-butyl-1,4-phenylene ether),
poly(2-ethyl-6-n-propyl-1,4-phenylene ether),
poly(2,3,6-trimethyl-1,4-phenylene ether),
poly[2-(4'-methylphenyl)-1,4-phenylene ether],
poly(2-bromo-6-phenyl-1,4-phenylene ether),
poly(2-methyl-6-phenyl-1,4-phenylene ether),
poly(2-phenyl-1,4-phenylene ether),
poly(2-chloro-1,4-phenylene ether),
poly(2-methyl-1,4-phenylene ether),
poly(2-chloro-6-ethyl-1,4-phenylene ether),
poly(2-chloro6-bromo-1,4-phenylene ether),
poly(2,6-di-n-propyl-1,4-phenylene ether),
poly(2-methyl-6-isopropyl-1,4-phenylene ether),
poly(2-chloro-6-methyl-1,4-phenylene ether),
poly(2-methyl-6-ethyl-1,4-phenylene ether),
poly(2,6-dibromo-1,4phenylene ether),
poly(2,6-dichloro-1,4-phenylene ether),
poly(2,6diethyl-1,4phenylene ether) and
poly(2,6-dimethyl-1,4-phenylene ether), a copolymer thereof, or a copolymer with styrenic compound and the like.

In addition, a graft copolymer or a block copolymer of an aromatic vinyl compound such as Styrene and the aforestated poly(phenylene ether) can be employed. Among the above-mentioned poly(phenylene ether), poly(2,6-dimethyl-1,4-phenylene ether) is particularly desirable for use. The above-mentioned poly(phenylene ether) may be used alone or in combination with at least one other.

The molecular weight of the poly(phenylene ether) is not particularly limited, but is preferably not less than 0.4 dL(deciliter)/g, more preferably not less than 0.5 dL/g of intrinsic viscosity. If the intrinsic viscosity is less than 0.4 dL/g, it is unfavorably less effective in improving the impact resistance of the composition. The intrinsic viscosity was measured in chloroform at 25° C.

The amount of the poly(phenylene ether) to be added is about 0.1 to 10%, preferably about 0.5 to 5.0% by weight If the amount of the poly(phenylene ether) is less than 0.1% by weight, it is less effective in improving the impact resistance, whereas more than 10.0% by weight unfavorably brings about the deterioration of the moldability of the resin composition as well as the activity of the catalyst.

(d) Other Additives

Other additives, such as inorganic filler, may be added to the reactor alloy of the present invention during palletizing process in order to increase rigidity.

A nucleating agent may be added in order to accelerate crystallization of sPS. Any conventional nucleating agents may be used e.g., metal carboxylates such as aluminum di-(pt-butylbenzoate); sodium methylenebis(2,4-di-t-butylphenol)phosphate; talc; and phthalocyanine derivatives and the like. The nucleating agents may be used alone or in combination thereof.

Flame retardant and flame retardant aid can be used, such as brominated polystyrene, brominated syndiotactic polystyrene, brominated poly(phenylene ether), etc. as flame retardant, and antimony compounds such as antimony trioxide, etc. as flame retardant aid. Any of them may be used alone or in combination with at least one other.

Further, (2,6-di-tert-butyl-4-methylphenyl)pentaerythritol diphosphate (produced by Adeka Argus Co., Ltd. under the trademark "PEP-36") and tetrakis[methylene-3-(3',5'-di-tert-butyl-4'-hydroxyphenyl)]propionate (produced by Adeka Argus Co., Ltd. under the trademark "MARK A060") may be used as an antioxidant. The antioxidant may be used alone or in combination with at least one other.

Other additives may be added to the reactor alloy of the present invention by compounding and blending, when desired.

The present invention will be described in more detail by the following Examples. The Examples are given only to illustrate the present invention and not intended in any way to limit the scope of the invention.

EXAMPLES (a) syndiotactic polystyrene, (b) rubbery elastomer and (c) polyphenylene ether used in the Examples and Comparative Examples are as follows:

(a) Preparation of Syndiotactic Polystyrene

Syndiotactic polystyrene was prepared in a glass reactor equipped with a temperature controller, a magnetic agitator or a mechanical agitator, and valves through which the monomers and nitrogen were fed. To the glass reactor substituted with nitrogen gas, 200 ml of purified styrene monomer, triisobutylaluminum ($8.0 \times 10^{-3}$ mol) and methyl aluminoxane (concentration of aluminum: $2.0 \times 10^{-3}$ mol) as a cocatalyst were added with stirring. To the above mixed solution, a certain amount of a catalyst (concentration of titanium=$2.0 \times 10^{-5}$ mol) was added to start polymerization. After reaction for a while, a small amount of methanol was added to stop proceeding polymerization The resulting solution was washed with methanol in excess and sodium hydroxide and then filtered. The resulting polymer was dried at 90° C. in vacuum for about 4 hours to obtain 138 g of syndiotic polystyrene.

The physical properties of the syndiotactic polystyrene obtained therefrom are as follows;

syndiotacticity: 98% weight-average molecular weight (Mw): 516,000 and molecular weight distribution (Mw/Mn): 2.39 melting point: 273° C.

(b) Rubbery Elastomer (1) Hydrogenated Styrene/Butadiene/Styrene Block Copolymer (SEBS):

A commercial product (Kraton G-1651) of Shell Co. (vacuum-dried at the temperature of more than 70° C.) was used as SEBS.

(2) Styrene/Butadiene/Styrene Block Copolymer (SBS):

A commercial product (411) of LG Chemical Co. of Korea (vacuum-dried at the temperature of more than 70° C.) was used as SBS.

(3) Ethylene/Styrene pseudo-random copolymer-1 (ESI-1):

Ethylene/Styrene pseudo-random copolymer-1 was prepared by the same method shown in European Patent 416,815 A2, having the following physical properties:

styrene contents: 10.8 mol % weight-average molecular weight (Mw): 222,000 and molecular weight distribution (Mw/Mn) :1.92 melting point: 69° C.

(4) Ethylene/Styrene pseudo-random copolymer-2 (ESI-2):

Ethylene/Styrene pseudo-random copolymer-2 was prepared by the same method shown in European Patent 416,815 A2, having the following physical properties:

styrene contents: 25.6 mol % weight-average molecular weight (Mw): 79,000 and molecular weight distribution Mw/Mn) : 1.84

(5) Ethylene-Propylene/Dien Terpolymer (EPDM)

A commercial product (EP57P) of Japan Synthetic Rubber Co. (vacuum-dried at the temperature of more than 70° C.) was used as EPDM.

(c) Polyphenylene Ether (PPE)

A commercial product (P401) of Asahi Co. of Japan (vacuum-dried at the temperature of more than 70° C.) was used as PPE.

Examples 1–15

Reactor Alloy

Reactor alloys were prepared in the same manner as in the above preparation of syndiotactic polystyrene except that purified rubbery elastomer (b) alone or in combination with purified polyphenylene ether (c) was mixed with 200 ml of syndiotactic polystyrene, followed by melting and then polymerizing. The polymerization conditions and results for Examples 1–15 are shown in Table 1 below.

TABLE 1

| Example | rubbery elastomer(b)(g) | | polyphenylene ether(c)(g) | polym. time(min) | yield (%) | conversion (%) | activity* |
|---|---|---|---|---|---|---|---|
| 1 | SEBS | 20 | 4 | 60 | 85 | 33.6 | 3,050 |
| 2 |  | 20 | 2 | 60 | 91 | 38.0 | 3,450 |
| 3 |  | 20 | 1 | 30 | 85 | 35.2 | 6,400 |
| 4 |  | 15 | 2 | 60 | 95 | 42.9 | 3,900 |
| 5 |  | 10 | 1 | 30 | 93 | 45.1 | 8,200 |
| 6 |  | 5 | 1 | 30 | 85 | 43.5 | 7,900 |
| 7 | SEBS | 20 | — | 30 | 102 | 44.6 | 8,100 |
| 8 |  | 10 | — | 30 | 125 | 63.0 | 11,450 |

TABLE 1-continued

| Example | rubbery elastomer(b)(g) | | polyphenylene ether(c)(g) | polym. time(min) | yield (%) | conversion (%) | activity* |
|---|---|---|---|---|---|---|---|
| 9 | ESI-1 | 16 | — | 30 | 100 | 46.2 | 8,400 |
| 10 | | 7 | — | 30 | 111 | 57.2 | 10,400 |
| 11 | ESI-2 | 10 | 2 | 60 | 98 | 47.3 | 4,300 |
| 12 | ESI-2 | 16 | — | 30 | 138 | 67.0 | 12,200 |
| 13 | | 10 | — | 30 | 123 | 61.8 | 11,250 |
| 14 | SBS | 20 | 4 | 60 | 89 | 38.0 | 3,250 |
| 15 | EPDM | 21 | 2 | 60 | 102 | 43.5 | 3,950 |

*Kg-sPS/mol[Ti] hr

Examples 7–10 and 12–13 which rubbery elastomer (b) alone was added to syndiotactic polystyrene without polyphenylene ether show higher polymerization activities than Examples 1–6 which employs polyphenylene ether. It is thought that rubbery elastomers are dissolved by styrene monomer, resulting in increase of viscosity, thereby forming minute bubbles in the solution, which plays a role of inhibiting agglomeration of the polymers to increase the activity.

In addition, if the conversion rate is about 30% or more, the polymer is in the form of sphere and the powder having 0.51 of bulk density with good morphology can be obtained. Accordingly, the polymers therefrom have good flowability to be an advantage in the process.

On the other hand, Examples 1–6, 11 and 14–15 which rubbery elastomer (b) and polyphenylene ether (c) were added to syndiotactic polystyrene show a decrease in activity in accordance with the amount of polyphenylene ether, as shown in Table 1, which results from the decrease in activity of the styrene, since the unshared electron pairs of oxygen atom consisting the ether bond in the polyphenylene ether are coordinated in the active site of the catalyst.

Comparative Examples 1–8

Melt Blends

Comparative Examples 1–8 were conducted with the same amount of rubbery elastomer (b) and polyphenylene ether (c) in order to compare with reactor alloy of the Examples. The melt blends were prepared by melt-kneading sPS homopolymer with rubbery elastomer (b) and polyphenylene ether (c) using Haake Mixer for 3 minutes at 280° C. The results are shown in Table 2.

TABLE 2

| | | components (wt %) | | | | physical properties | |
|---|---|---|---|---|---|---|---|
| | | sPS(a) | Rubbery elastomer(b) | | polyphenylene ether(c) | flexural strength | Izod impact strength |
| Examples | 1 | 75.7 | SEBS | 22.1 | 2.2 | 18,550 | 40.3 |
| | 2 | 71.8 | | 23.5 | 4.7 | 18,980 | 39.8 |
| | 3 | 75.3 | | 23.5 | 1.2 | 19,220 | 34.9 |
| | 4 | 82.1 | | 15.8 | 2.1 | 22,450 | 20.5 |
| | 5 | 88.1 | | 10.8 | 1.1 | 28,500 | 13.4 |
| | 6 | 92.9 | | 5.9 | 1.2 | 29,410 | 7.4 |
| | 7 | 80.4 | SEBS | 19.6 | — | 19,280 | 8.6 |
| | 8 | 92.0 | | 8.0 | — | 28,020 | 3.6 |
| | 9 | 84.0 | ESI-1 | 16.0 | — | 21,160 | 1.7 |
| | 10 | 93.7 | | 6.3 | — | 28,450 | 1.3 |
| | 11 | 88.4 | ESI-2 | 11.6 | — | 28,090 | 1.4 |
| | 12 | 91.9 | | 8.1 | — | 29,090 | 1.5 |
| | 13 | 87.8 | ESI-2 | 10.2 | 2.0 | 28,400 | 4.6 |
| | 14 | 73.0 | SBS | 22.5 | 4.5 | 16,580 | 23.9 |
| | 15 | 77.1 | EPDM | 20.5 | 2.0 | 28,720 | 3.4 |
| Comparative Examples | 1 | 72.0 | | 23.5 | 4.5 | 24,500 | 10.3 |
| | 2 | 75.7 | SEBS | 22.1 | 2.2 | 25,430 | 9.3 |
| | 3 | 88.1 | | 10.8 | 1.1 | 26,700 | 3.2 |
| | 4 | 80.4 | SEBS | 19.6 | — | 22,810 | 5.6 |
| | 5 | 93.7 | ESI-1 | 6.3 | — | 25,440 | 1.0 |
| | 6 | 87.8 | ESI-2 | 10.2 | 2.0 | 28,020 | 3.0 |
| | 7 | 77.1 | EPDM | 20.5 | 2.0 | 29,510 | 1.9 |
| | 8 | 74.0 | SEBS SEBS-MA* | 18.0 4.0 | 4.0 | 17,950 | 29.8 |

*Compatibilizing Agent disclosed in U.S. Pat. No. 6,048,932

As shown in Table 2, the reactor alloys of Examples show high impact strength compared to melt blends of the Comparative Examples. Comparing Examples 1, 2 and 5 with Comparative Examples 2, 1 and 3 respectively, the reactor alloy products have higher impact resistance than melt blend products. Additionally, as is demonstrated in Example 7 and Comparative Example 4 which do not contain polyphenylene ether, the same results can be obtained. Further, if SEBS used as rubbery elastomer (b) is substituted with ESI, EPDM, SBS and the like, the same results can be obtained.

Furthermore, the reactor alloy of Example 2 shows an impact strength four times as high as the melt blend of Comparative Example 1 having the same amount of rubbery elastomer as in Example 2 and shows a good flexural modulus which results from its good mixing property.

U.S. Pat. No. 6,048,932 employs SEBS-MA prepared by grafting SEBS and maleic anhydride in order to enhance the mixing property of sPS and SEBS as a compatibilizing agent As shown in Comparative Example 8, the composition was endowed with enhanced impact resistance compared to those not containing SEBS. However, the impact resistance of that of U.S. Pat. No. 6,048,932 shows a low value compared to that of the present invention.

In addition, since U.S. Pat. No. 6,048,932 needs a process of grafting SEBS and maleic anhydride, it brings about commercial disadvantage. As it is clear from the results, the reactor alloy of syndiotactic polystyrene of the present invention is enhanced in impact resistance as well as flexural modulus compared to any other conventional melt blend compositions.

Figure 2:
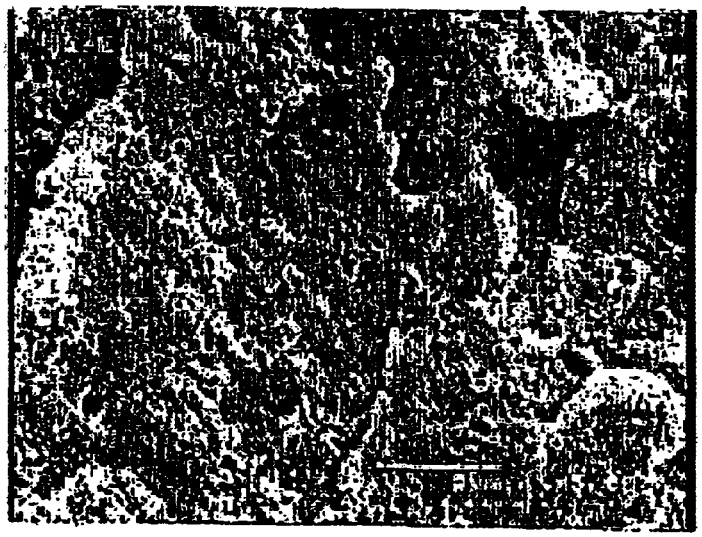
FIG. 2 is a scanning electron microscope (SEM) photograph of an injection molded test piece of the melt blend prepared in accordance with the method of Comparative Example 8.

The microstructure of the reactor alloy of the present invention was measured by scanning electron microscope (SEM) photograph. The representative results are shown in FIGS. 1 and 2 for Example 2 and Comparative Example 8, respectively. The injection molded test pieces of the reactor alloy (Example 2) and the melt blend(Comparative Example 8) are cut in liquid nitrogen, followed by liquating the rubber-phase component in toluene for 30 minutes at 50° C. As shown in FIGS. 1 and 2, the rubber phase domain of the reactor alloy (Example 2) according to the present invention has a fine and uniform surface in comparison with that of the melt blend (Comparative Example 8) comprising a compatibilizing agent (SEBS-MA).

Further, when polymers from the Examples and Comparative Examples were eluted by hot toluene for more than 24 hours, the amount of rubbery elastomer (b) and polyphenylene ether extracted from the polymer of the present invention was less than that of the melt blend at the same condition. By this result, it was thought that part of remaining double bonds of rubbery elastomer (b) is copolymerized with sPS in the polymerization, thereby causing the reactor alloy of the present invention to have good mechanical properties in comparison with the melt blend of the same composition.

As shown in Tables 1 and 2, use of polyphenylene ether makes the polymerization activity decreased, while, it makes the Izod impact strength increased. Therefore it is preferable to add the polyphenylene ether to prepare a reactor alloy of syndiotactic polystyrene having high impact resistance.

The present invention can be easily carried out by an ordinary skilled person in the art. Many modifications and changes may be deemed to be with the scope of the present invention as defined in the following claims.

What is claimed is:

1. A reactor alloy of syndiotactic polystyrene prepared by polymerizing vinyl aromatoic monomer and rubbery elastomer under the catalyst system consisting of a transition metal catalyst and a cocatalyst, which comprises (a) 50–99% by weight of syndiotactic polystyrene and (b) 1–50% by weight of rubbery elastomer.

2. The reactor alloy of syndiotactic polystyrene as defined in claim 1, wherein said vinyl aromatic monomer is represented by following formulae (A) and (B):

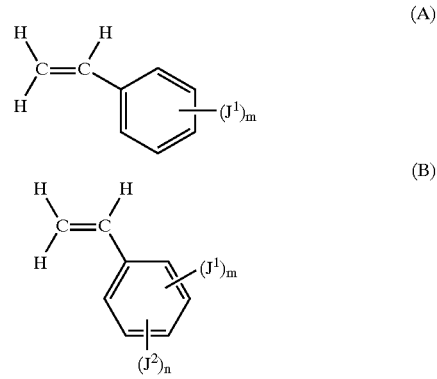

where in formula (A), $J^1$ is a hydrogen; a halogen; or a substituting group containing at least one of carbon, oxygen, silicon, phosphorus, sulfur, selenium and is tin; and m is an integer of 1 to 3, and if m is 2 or 3, $J^1$s may be different each other, and where in formula (B), $J^1$ is a hydrogen; a halogen; a substituting group containing at least one of carbon, oxygen, silicon, phosphor, sulfur, selenium and tin; $J^2$ is a substituting group of $C_{2-10}$ having at least one unsaturated bond; m is an integer of 1 to 3, and if m is 2 or 3, $J^1$s may be different each other; and n is 1 or 2 and if n is 2, $J^2$s may be different each other.

3. The reactor alloy of syndiotactic polystyrene as defined in claim 2, wherein said vinyl aromatic monomer represented by formula (A) is selected from the group consisting of alkylstyrene such as styrene, methylstyrene, ethylstyrene, butylstyrene, p-methylstyrene, p-tert-butylstyrene, and dimethylstyrene; halogenated styrene such as chlorostyrene, bromostyrene, and fluorostyrene; halogen-substituted alkylstyrene such as chloromethylstyrene, bromomethylstyrene, and fluoromethylstyrene; alkoxystyrene such as methoxystyrene, ethoxystyrene, and butoxystyrene; vinylbiphenyl such as 4-vinylbiphenyl, 3-vinylbiphenyl, and 2-vinylbiphenyl; vinylphenylnaphthalene such as 1-(4-vinylbiphenylnaphthalene), 2-(4-vinylbiphenylnaphthalene), 1-(3-vinylbiphenylnaphthalene), 2-(3-vinylbiphenylnaphthalene), and 1-(2-vinylbiphenylnaphthalene); vinylphenylanthracene such as 1-(4-vinylphenyl)anthracene, 2-(4-vinylphenyl)anthracene, 9-(4-vinylphenyl)anthracene, 1-(3-vinylphenyl)anthracene, 9-(3-vinylphenyl)anthracene, and 1-(4-vinylphenyl)anthracene; vinylphenylpyrene such as 1-(4-vinylphenyl)pyrene, 2-(4-vinylphenyl)pyrene, 1-(3-vinylphenyl)pyrene, 2-(3-vinylphenyl)pyrene, 1-(2-vinylphenyl)pyrene, and 2-(2-vinylphenyl)pyrene; trialkylsilylvinylbiphenyl such as 4-vinyl4-triethylsilylbiphenyl; alkylsilylstyrene such as p-trimethylsilyktyrene, m-trimethylsilylstyrene, o-trimethylsilylstyrene, p-triethylsilylstyrene, m-triethylsilylstyrene, and o-triethylsilylstyrene; carboxylmethylstyrene; alkylesterstyrene; vinylbenzenesulfonate; and vinylbenyldialkoxyphosphite; and the vinyl aromatic monomer represented by formula (B) is selected from the group consisting of divinylbenzene such as p-divinylbenzene and m-divinylbenzene, trivinylbenzene, and arylstyrene such as p-arylstyrene and m-arylstyrene.

4. The reactor alloy of syndiotactic polystyrene as defined in claim 1, wherein said syndiotactic polystyrene is selected from the group consisting of polystyrene, poly(alkylstyrene), poly(halogenated styrene), poly(alkoxystyrene), poly(vinyl benzoate), hydrogenated polystyrene, the copolymers thereof, and the mixtures thereof.

5. The reactor alloy of syndiotactic polystyrene as defined in claim 1, wherein said syndiotactic polystyrene has the syndiotactic structure having a proportion of racemic diad of at least 75%, or a proportion of racemic pentad of at least 30%.

6. The reactor alloy of syndiotactic polystyrene as defined in claim 1, wherein the weight average molecular weight of said syndiotactic polystyrene is about 10,000 or more.

7. The reactor alloy of syndiotactic polystyrene as defined in claim 1, wherein said rubbery elastomer (b) is selected from the group consisting of natural rubber; polybutadiene; polyisoprene; polyisobutyrene; neoprene; ethylene/styrene psuedo random copolymer (ESI); styrene/butadiene block copolymer (SBR); styrene/butadiene/styrene block copolymer (SBS); hydrogenated styrene/butadiene/styrene block copolymer (SEBS); styrene/isoprene block/styrene block copolymer (SIS); hydrogenated styrene/isoprene block/styrene block copolymer (SEPS); ethylene/propylene rubber (EPM); ethylene/propylene/dien rubber (EPDM); and rubber formed by modifying any of the foregoing with a modifying agent.

8. The reactor alloy of syndiotactic polystyrene as defined in claim 1, wherein said transition metal catalyst is a metallocene catalyst comprising a transition metal compound of Group IV element of the Periodic Table.

9. The reactor alloy of syndiotactic polystyrene as defined in claim 1, wherein said cocatalyst is alkyl aluminoxane or alkyl aluminum compound, wherein said alkyl aluminoxane is a compound such as methyl aluminoxane (MAO), modified methyl aluminoxane (MMAO) having the unit represented by the following formula (C) comprising a linear alkyl aluminoxane represented by the following formula (D) and a cyclic alkyl aluminoxane represented by the following formula (E):

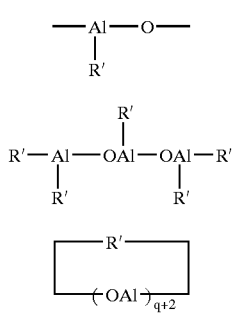

where $R^1$ is an alkyl group of $C_{1-6}$ and q is an integer of 0–100.

10. The reactor alloy of syndiotactic polystyrene as defined in claim 1, wherein said cocatalyst is a mixture of a non-coordinated Lewis acid and an alkyl aluminum, wherein said non-coordinated Lewis acid is selected from the group consisting of N,N-dimethylaniline tetrakis (pentafluorophenyl)borate, triphenylcarbenium tetrakis (pentafluorophenyl)borate, and ferrocerium tetrakis (pentafluorophenyl)borate and tris(pentafluorophenyl)borate, and wherein said alkylaluminum is selected from the group consisting of trimethylaluminum, triethylaluminum, diethylaluminum chloride, dimethylaluminum chloride, triisobutylaluminum, diisobutylaluminun chloride, tri(n-butyl)aluminum, tri(n-propyl)aluminum, and triisopropylaluminum.

11. The reactor alloy of syndiotactic polystyrene as defined in claim 1, further comprising an inorganic filler, a nucleating agent, a flame retardant, a light stabilizer, and/or an antioxidant.

12. The reactor alloy of syndiotactic polystyrene as defined in any one of claims 1–11, further comprising 0.1–10% by weight of (c) polyphenylene ether.

13. The reactor alloy of syndiotactic polystyrene as defined in claim 12, wherein said polyphenylene ether(c) is selected from the group consisting of poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl- 1,4-phenylene ether), poly(2-chloro6-ethyl-1,4-phenylene ether), poly(2-chloro-6-bromo1,4-phenylene ether), poly(2-chloro-6-bromo-1,4-phenylene ether), poly(2,6-di-n-propyl -1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether) and poly(2,6-dimethyl-1,4-phenylene ether), a copolymer thereof, or a copolymer with styrenic compound and a mixture thereof.

* * * * *

UNITED STATES PATENT AND TRADEMARK OFFICE
CERTIFICATE OF CORRECTION

PATENT NO. : 6,780,938 B2  Page 1 of 1
DATED : August 24, 2004
INVENTOR(S) : Sung Cheol Yoon et al.

It is certified that error appears in the above-identified patent and that said Letters Patent is hereby corrected as shown below:

Column 2,
Line 12, "farther" should read -- further --

Column 4,
Line 4, "unsated" should read -- unsaturated --
Line 63, "(TAO)" should read -- MMAO --

Column 5,
Line 42, "butadienistyrene" should read -- butadiene/styrene --

Column 6,
Line 38, "poly(2-chloro6-bromo-1,4-phenylene" should read -- poly(2-chloro-6-bromo-1,4-phenylene --

Signed and Sealed this

Fourteenth Day of December, 2004

JON W. DUDAS
*Director of the United States Patent and Trademark Office*